United States Patent Office 2,727,909
Patented Dec. 20, 1955

2,727,909

16α,17α-DIHYDROXYPREGNEN-20-ONE DERIVATIVES

Frank B. Colton, Chicago, Ill., assignor to G. D. Searle & Co., Chicago, Ill., a corporation of Illinois No Drawing. Application October 12, 1954,
Serial No. 461,925

6 Claims. (Cl. 260—397.4)

The present invention relates to a new group of 16α,17α-dihydroxypregnen-20-one derivatives and, more specifically, to compounds which can be represented by the general structural formula

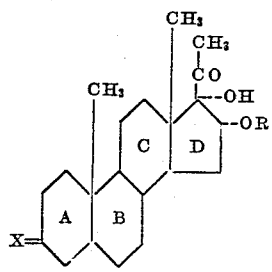

wherein one of the bonds linking the carbon atoms in position 5 to the carbon atoms in positions 4 and 6 is unsaturated, wherein R is a member of the class consisting of hydrogen and (lower alkyl)-CO— radicals and wherein X= is a member of the class consisting of oxo,

and

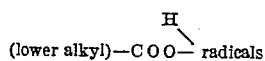

The lower alkyl radicals mentioned herein can be methyl, ethyl, straight and branched chain propyl, butyl, amyl, hexyl, cyclopentyl, cyclohexyl, cyclopentylmethyl, cyclopentylethyl, cyclopentylpropyl, cyclohexylethyl, and the like.

In the application Serial No. 393,214, filed November 19, 1953, Chinn and Thielen have described a series of 16β,17α-dihydroxy-20-ketopregnenes which they prepared by treatment of a 16α,17-oxido-20-ketopregnene with a lower alkanoic acid. Chinn and Thielen indicated in their application that their compounds are the 16β-epimers of the compounds obtained by applicant by the treatment of the corresponding Δ¹⁶-pregnenes with one molecular equivalent of osmium tetroxide in a solvent such as ether or tertiary butanol, followed by deosmylation with sodium sulfite. This process can be depicted structurally as follows:

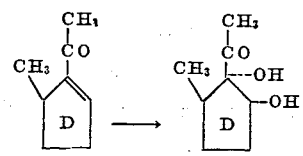

In the preparation of 16α,17α-dihydroxy-4-pregnene-3,20-dione the reaction can be carried out directly without protection of the double bond in ring A. For the synthesis of Δ⁵-pregnen-3-ols and their esters I prefer to use as starting materials the 5,6-dibromo compounds of the type

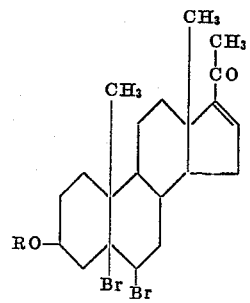

wherein R is a hydrogen or acyl group.

An alternative source for the preparation of the pregnen-20-ones of my invention are their phenylhydrazones which are synthesized by a procedure developed by R. M. Dodson. Thus a 16α,17α-oxidopregnen-20-one of the type

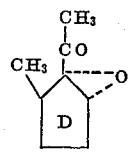

is treated with an aryl hydrazine of the formula Ar—NH—NH₂ (such as phenylhydrazine) and a lower alkanoic acid of the type R—COOH (such as acetic acid) to yield the corresponding phenylhydrazone of 16α-alkanoyloxy-17α-hydroxypregnen-20-one of the type

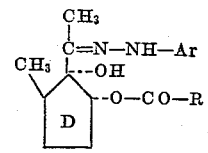

which can be deesterified to the phenylhydrazone of a 16α,17α-dihydroxypregnen-20-one of the type

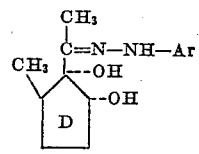

These phenylhydrazones can be converted to the free 20-oxo compounds by cleavage with a mixture of acetic and pyruvic acid.

The compounds of my invention have valuable hormonal and cardiovascular activity and are particularly of value as antihypertensive agents.

The following examples illustrate in further detail the compounds which constitute my invention and methods for their preparation. However, they are not to be construed as limiting the invention in spirit or in scope. In these examples quantities of material are indicated as parts by weight, temperature is indicated in degrees centigrade and optical rotations are determined at 25° C.

*Example 1*

To a solution of 7.4 parts of 4,16-pregnadiene-3,20-dione in 430 parts of anhydrous ether maintained at 0° C. are added 6.1 parts of osmium tetroxide in 143 parts of anhydrous ether. The reaction mixture is maintained at room temperature for a day, after which the greenish brown precipitate is collected on a filter and dissolved in 700 parts of ethanol and 200 parts of water. This solution is heated to reflux and then treated with 35 parts of sodium sulfite and 300 parts of water. Refluxing is continued for 2 hours after which the mixture is concentrated under vacuum to about 550 parts and extracted with ethyl acetate. The extract is dried over anhydrous sodium sulfate, filtered and taken to dryness under vacuum. The crystalline residue is dissolved in a 10% solution of ethyl acetate in benzene and thus applied to a chromatography column containing 500 parts of silica gel. The column is washed with 10, 15, and 20% solutions of ethyl acetate in benzene and then eluted with 40–50% solutions of ethyl acetate in benzene. These eluates are evaporated under vacuum and the residue is extracted with ethyl acetate. The extract is dried over anhydrous sodium sulfate, filtered and evaporated. The residue is crystallized first from a mixture of ethyl acetate in petroleum ether and then from aqueous methanol. The 16α,17α-dihydroxy-4-pregnene-3,20-dione melts at about 182–184° C. It has the structural formula

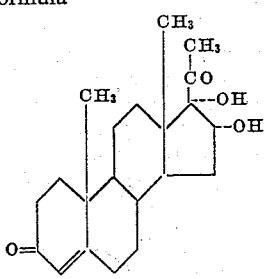

The chromatography column is next washed with 50% ethyl acetate in benzene and then eluted with 75% ethyl acetate in benzene. Evaporation of the eluate yields 1,3-dihydroxy - 10a,12a - dimethyl - 1,2,3,4,4a,4b,5,6,8,9,10,-10a,10b,11,12,12a-hexadecahydrochrysene-2,8-dione which has the structural formula

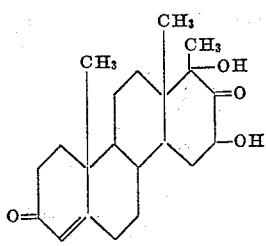

This compound melts at about 215–218° C. The specific rotation of a 5% chloroform solution is +88°.

*Example 2*

An anhydrous mixture of 12 parts of 3-acetoxy-5,16-pregnadien-20-one in 500 parts of chloroform and 20 parts of potassium acetate in 200 parts of acetic acid is stirred at 0° C. for 3.5 hours while a solution of 5.6 parts of bromine in 120 parts of glacial acetic acid is added dropwise. The chloroform solution is washed successively with sodium bicarbonate solution and water, dried over anhydrous calcium sulfate and then concentrated under vacuum.

To a solution of 24.5 parts of 3-acetoxy-5,6-dibromo-4,16-pregnadien-20-one in 800 parts of anhydrous ether maintained at 0° C., there are added 12.2 parts of osmium tetroxide in 280 parts of ether. The reaction mixture is maintained at 20° C. for 15 hours, after which the precipitate is collected on a filter and dissolved in 2000 parts of 80% ethanol. This solution is heated at reflux and then treated with a solution of 70 parts of sodium sulfite in 600 parts of water and 100 parts of zinc. Refluxing is continued for 1 hour after which the mixture is filtered and then concentrated to about one-third of its original volume and extracted with ethyl acetate. This extract is dried over anhydrous calcium sulfate, filtered and taken to dryness under vacuum. The resulting residue is chromatographed over silica gel by the method of the preceding example to yield the 3,16α,17α-trihydroxy-5-pregnen-20-one which, recrystallized from acetone and cyclohexane, melts at about 224–225° C., resolidifies and then remelts at 243–248° C. It has the structural formula

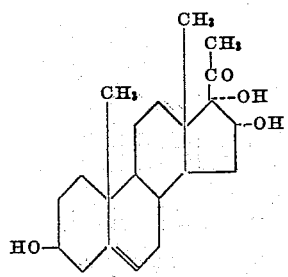

Further elution of the column as in the preceding example yields a D-homo rearrangement product, the 1,3,8-trihydroxy - 10a,12a - dimethyl - 1,2,3,4,4a,4b,5,7,8,9,10, 10a,10b,11,12,12a-hexadecahydrochrysen-2-one which has the structural formula

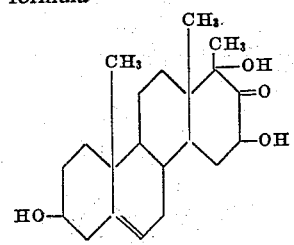

*Example 3*

A mixture of 1 part of 3β,16α,17α-trihydroxy-5-pregnen-20-one, 50 parts of pyridine and 53 parts of acetic anhydride is maintained at 25° C. for 12 hours and then diluted with ice. The precipitate is collected on a filter, washed with water, and crystallized repeatedly from a mixture of acetone and cyclohexane. The 3β,6α-diacetoxy-17α-hydroxy-5-pregnen-20-one thus obtained melts at about 213–215° C. It has the structural formula

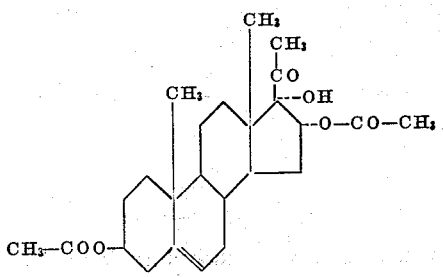

Substitution of 82 parts of butyric anhydride for the acetic anhydride used in the foregoing process yields the 3,16α-dibutyroxy-17-hydroxy-5-pregnen-20-one which has the structural formula

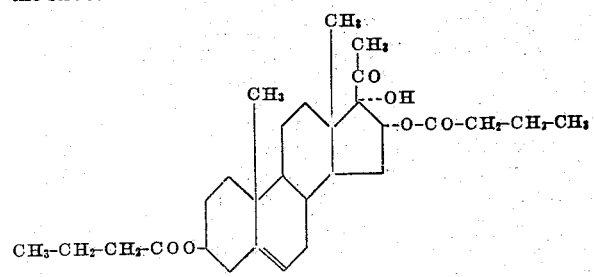

The infrared absorption spectrum of this compound shows maxima at 2.84, 5.80, 5.89, 7.30 and 7.42 microns.

*Example 4*

Under a nitrogen atmosphere a mixture of 725 parts of 16α,17-epoxy-3β-hydroxy-5-pregnen-20-one, 796 parts of phenylhydrazine and 7600 parts of glacial acetic acid is permitted to stand at room temperature for 13 hours. The resulting precipitate is collected on the filter, washed with 67% acetic acid and crystallized from dilute methanol.

An additional yield is obtained by concentration of the acetic acid mother liquor. The phenylhydrazone of 16α-acetoxy-3β,17α-dihydroxy-5-pregnen-20-one thus obtained melts at about 222–223° C. to an orange melt with decomposition.

*Example 5*

A mixture of 200 parts of the phenylhydrazone of 16α-acetoxy-3β,17α-dihydroxy-5-pregnen-20-one and 200 parts of sodium methoxide is heated on the steam bath in an open vessel for 30 minutes and then diluted with water until it becomes cloudy. After cooling the precipitate is collected on a filter and recrystallized from a mixture of acetone and cyclohexane. The phenylhydrazone of 3β,16α,17α-trihydroxy-5-pregnen-20-one is thus obtined in white crystals melting at about 208.5–209.5° C. to a yellow melt with decomposition.

*Example 6*

A mixture of 5 parts of the phenylhydrazone of 3β,16α,17α-trihydroxy-5-pregnen-20-one, 525 parts of glacial acetic acid, 90 parts of water and 5 parts of pyruvic acid is stirred for 15 hours. The mixture is then diluted with water, the precipitate collected on a filter and crystallized from acetone. The 3β,16α,17α-trihydroxy-5-pregnen-20-one thus obtained melts at about 224–225° C., resolidifies and melts again at about 244–247° C. The compound has the structural formula

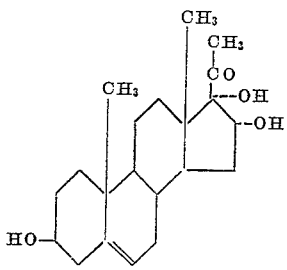

*Example 7*

A mixture of 1 part of the phenylhydrazone of 16α-acetoxy-3β,17α-dihydroxy-5-pregnen-20-one, 50 parts of pyridine and 55 parts of acetic anhydride in maintained at room temperature for 15 hours and then diluted with ice. The precipitate is collected on a filter and crystallized from dilute methanol. The phenylhydrazone of the 3β,16α-diacetoxy-17α-hydroxy-5-pregnen-20-one thus obtained melts at about 216–217° C. with decomposition. The ultraviolet absorption spectrum shows a maximum at 273.5 millimcrons with a molecular extinction coefficient of 23,500. The identical product is obtained by reaction of 2.7 parts of the phenylhydrazone of 3β,16α,17α-trihydroxy-5-pregnen-20-one, 100 parts of pyridine and 105 parts of acetic anhydride under the foregoing conditions.

*Example 8*

A solution of 5 parts of the phenylhydrazone of 3β,16α - diacetoxy - 17α - hydroxy - 5 - pregnen - 20-one, 800 parts of glacial acetic acid, 150 parts of water, and 1 part of pyruvic acid is permitted to stand at room temperature for 15 hours. The reaction mixture is filtered and the filtrate is diluted with water. The precipitate is collected on a filter, dried in air and then applied in benzene solution to a chromatography column containing 200 parts of silica gel. The column is washed with benzene, 2% and 5% solutions of ethyl acetate in benzene and then eluted with a 10% solution of ethyl acetate in benzene. This eluate is concentrated and crystallized from dilute acetone to yield 3β,16α-diacetoxy-17α-hydroxy-5-pregnen-20-one melting at about 212.5–214.5° C.

What is claimed is:

1. A compound of the structural formula

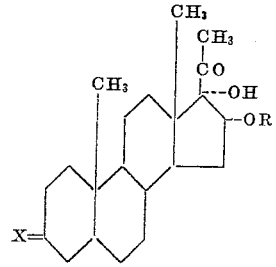

wherein one of the bonds linking the carbon atom in position 5 to the carbon atoms in positions 4 and 6 is unsaturated, wherein R is a member of the class consisting of hydrogen and (lower alkyl)—CO— radicals and wherein X= is a member of the class consisting of oxo,

and

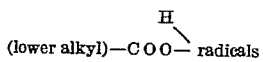

2. 16α,17α-dihydroxy-4-pregnene-3,20-dione.
3. 3,16α,17α-trihydroxy-5-pregnen-20-one.
4. A compound of the structural formula

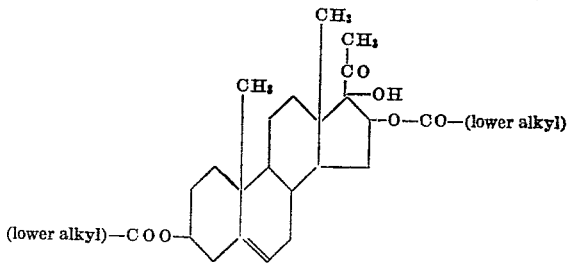

5. A compound of the structural formula

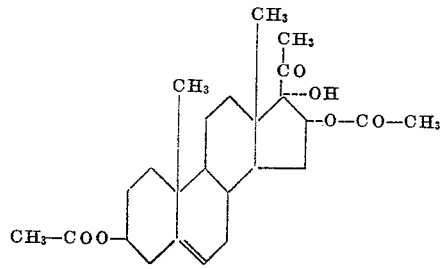

6. The process of preparing 16α,17α - dihydroxy - 4-pregnene-3,20-dione which comprises oxidizing 4,16-pregnadien-3,20-dione with osmium tetroxide.

References Cited in the file of this patent

UNITED STATES PATENTS

| | | |
|---|---|---|
| 2,265,143 | Butenandt | Dec. 9, 1941 |
| 2,602,804 | Kendall | July 8, 1952 |
| 2,666,770 | Wall | Jan. 19, 1954 |
| 2,683,712 | Hogg | July 13, 1954 |
| 2,684,364 | Jones | July 20, 1954 |